US011593701B2

(12) United States Patent
McNamara

(10) Patent No.: US 11,593,701 B2
(45) Date of Patent: Feb. 28, 2023

(54) TECHNOLOGIES FOR USER-ASSISTED MACHINE LEARNING

(71) Applicant: INTEL CORPORATION, Santa Clara, CA (US)

(72) Inventor: Edward Gerard McNamara, Pallasgreen (IE)

(73) Assignee: Intel Corporation, Santa Clara, CA (US)

( * ) Notice: Subject to any disclaimer, the term of this patent is extended or adjusted under 35 U.S.C. 154(b) by 1031 days.

(21) Appl. No.: 16/306,145

(22) PCT Filed: Jun. 30, 2017

(86) PCT No.: PCT/US2017/040222
§ 371 (c)(1),
(2) Date: Nov. 30, 2018

(87) PCT Pub. No.: WO2018/005933
PCT Pub. Date: Jan. 4, 2018

(65) Prior Publication Data
US 2020/0327442 A1 Oct. 15, 2020

Related U.S. Application Data

(60) Provisional application No. 62/357,657, filed on Jul. 1, 2016.

(51) Int. Cl.
*G06N 20/00* (2019.01)
*A01K 27/00* (2006.01)
(Continued)

(52) U.S. Cl.
CPC ........... *G06N 20/00* (2019.01); *A01K 27/001* (2013.01); *G06F 18/2178* (2023.01); *G06F 18/2431* (2023.01)

(58) Field of Classification Search
CPC .... G06N 20/00; A01K 27/001; G06K 9/6263; G06K 9/628
(Continued)

(56) References Cited

U.S. PATENT DOCUMENTS 6,757,668 B1 * 6/2004 Goebel .............. G05B 23/0221
706/47
9,892,133 B1 * 2/2018 Biessmann ............ G06N 20/10
(Continued)

FOREIGN PATENT DOCUMENTS

WO      2018005933      1/2018

OTHER PUBLICATIONS

PCT Search Report and Written Opinion prepared for PCT/US2017/040222, completed Oct. 18, 2017.
(Continued)

*Primary Examiner* — Jeffery A Williams
(74) *Attorney, Agent, or Firm* — Hanley, Flight & Zimmerman, LLC

(57) ABSTRACT

Technologies for user-assisted machine learning includes a compute device configured to request user assistance to classify sensor data in response to a determination that a confidence score associated with the classification of the sensor data is below a threshold value and/or if the classification of the sensor data is unknown. In an illustrative embodiment, the compute device is configured to communicate with an activity monitor device, such as a smart pet collar, to determine activities of the subject (e.g., a pet) based on classification data received from the smart pet collar.

36 Claims, 7 Drawing Sheets

(51) Int. Cl.
*G06K 9/62* (2022.01)
*G06F 18/21* (2023.01)
*G06F 18/2431* (2023.01)

(58) Field of Classification Search
USPC .......................................................... 706/12
See application file for complete search history.

(56) References Cited

U.S. PATENT DOCUMENTS

| | | | |
|---|---|---|---|
| 2011/0050897 A1* | 3/2011 | Cobb | G06V 10/94 |
| | | | 348/E7.054 |
| 2012/0011142 A1 | 1/2012 | Baheti et al. | |
| 2014/0324745 A1 | 10/2014 | Leppanen et al. | |
| 2014/0341476 A1 | 11/2014 | Kulick et al. | |
| 2015/0254555 A1 | 9/2015 | Williams, Jr. et al. | |
| 2016/0026404 A1 | 1/2016 | Taylor | |

OTHER PUBLICATIONS

International Searching Authority, "International Preliminary Report on Patentability," mailed in connection with International Patent Application No. PCT/US2017/040222, dated Jan. 1, 2019, 7 pages.

* cited by examiner

TECHNOLOGIES FOR USER-ASSISTED MACHINE LEARNING

CROSS-REFERENCE TO RELATED APPLICATIONS

The present application claims priority to U.S. Provisional Patent Application No. 62/357,657, entitled "TECHNOLOGIES FOR USER-ASSISTED MACHINE LEARNING," which was filed on Jul. 1, 2016.

BACKGROUND

Machine learning is used in compute systems to classify monitored data using one or more machine learning techniques, such as pattern matching. To do so, in many machine learning algorithms, a training period is implemented in which the corresponding compute system is taught a classification process using a sample set of data. During the training period, a user may instruct the compute system on how to properly classify the sample data. After the training period and during operation, the compute system automatically classifies sensed data using the taught classification process. The compute system may update the classification process based on the observed data and, in this way, "learn" over time. However, the user of the compute system typically has no further interaction with the machine learning algorithm or classification process after the initial training period.

Activity monitors are electrical devices worn by people or animals to monitor physical activities. For example, a pedometer may measure or estimate the distance a person or animal has traveled. Most activity monitors are programmed to detect the specific activity based on a fixed identification algorithm (e.g., based on motion detected by an accelerometer).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
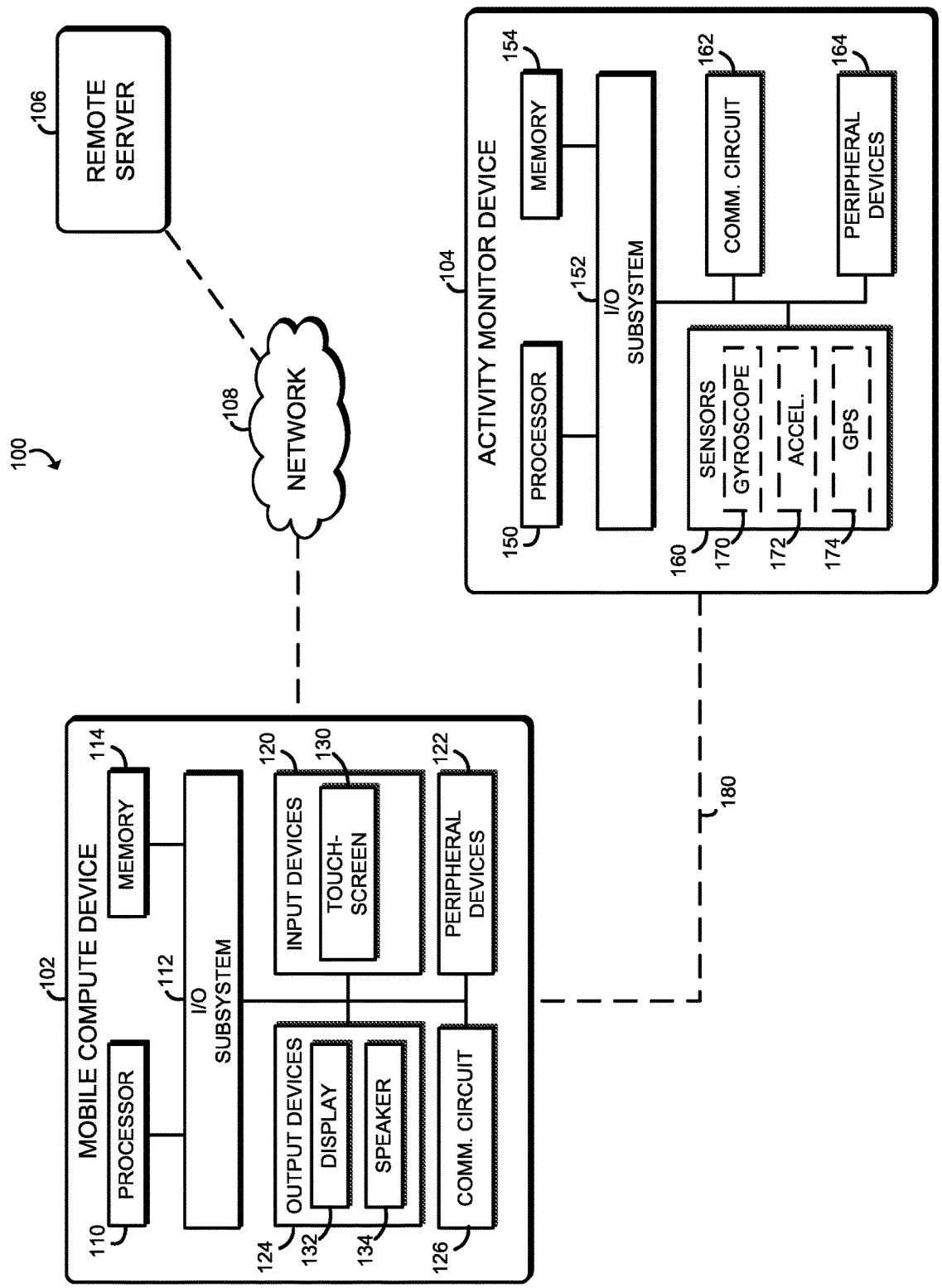
FIG. 1 is a simplified block diagram of at least one embodiment of a system for user assisted machine learning.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for user-assisted machine learning includes a mobile compute device 102, an activity monitor device 104, and a remote server 106 configured to communicate with the mobile compute device 102 over a network 108. In use, as discussed in more detail below, the activity monitor device 104 is configured to collect sensor data indicative of an activity of a corresponding subject from one or more local sensors. The activity monitor device 104 classifies the sensor data utilizing a machine learning algorithm, such as a pattern matching algorithm. For example, in the illustrative embodiment, the activity monitor device 104 classifies the sensor data by determining classification data indicative of a present activity of the subject (e.g., walking, running, sitting, resting, etc.). The determined classification data includes a confidence score indicative of a level of confidence of the accuracy of the classification of the sensor data. For example, if the sensor data has a high degree of correlation to an existing classification or pattern, the confidence score of the classification may be relatively high. Conversely, if the sensor data has only a moderate or a low degree of correlation to an existing classification or pattern, the confidence score of the classification may be relatively low. As such, the confidence score may be embodied as any type of value or other data capable of providing an indication of the level of confidence. In some cases, the sensor data may not correlate or match any existing classifications or patterns and, in such cases, the activity monitor device 104 may determine that the classification of the sensor data is unknown.

After the activity monitor device 104 determines the classification data based the sensor data, the activity monitor device 104 transmits the classification data to the mobile compute device 102 over a communication link 180, which may be embodied as any type of communication link suitable to facilitate communications between the activity monitor device 104 and the mobile compute device 102. In the illustrative embodiment, the communication link 180 is embodied as a short range communication link, such as a Bluetooth® low energy (BLE) communication link.

As discussed in more detail below, the activity monitor device 104 may be embodied as any type of device, circuit, or component configured to monitor sensor data indicative of an activity of a subject. The subject being monitored may be a living animal, such as a human, a pet, a livestock animal, a racehorse, etc. Attentively, the subject may be embodied as a separate compute system or device that is capable of motion such as a robot, autonomous vehicle, machinery, or other movable device or system. In embodiments in which the subject is a living animal, the activity monitor device 104 may be embodied as a wearable compute device configured to monitor sensor data indicative of a movement of the subject wearing the activity monitor device 104. For example, in various embodiments, the activity monitor device 104 may be worn by patient to measure the patient's gait or movement, worn by a child in day care to monitor the child's movement or activities, worn by an exercise training client to monitor the trainee's exercise movements or activity, or by any other animal in an environment in which the monitoring of the subject's movement or activities is desired. For example, in the illustrative embodiment, the activity monitor device 104 is embodied as a smart pet collar 104 configured to monitor sensor data indicative of an activity of a pet wearing the smart pet collar to classify the activity of the pet (e.g., "walking," "trotting," "sprinting," "sitting", etc.). Of course, it should be appreciated that, for various reasons, classifying sensor data indicative of an activity of a pet (or other living animal) can be particularly difficult, even when using a machine learning algorithm. For example, in the embodiments in which the subject is a pet, the vast variations in dogs (e.g., the breed, size, age, neuter state, fur length, etc.) result in an extremely large pool of sample data/tests to establish even an initial knowledgebase, which must then be updated overtime. Similarly, in embodiments in which the subject is a person, the variations of humans (e.g., weight, height, health, etc.) likewise results in a large pool of sample data/tests.

As such, the mobile compute device 102 is configured to utilize user-assisted learning to help classify sensor data that is determined by the activity monitor device 104 to be either unknown or of low confidence. For example, in use, the mobile compute device 102 is configured to request assistance from a user to help classify sensor data that is determined to have a low confidence or unknown classification. To do so, the mobile compute device 102 presents several possible classifications to the user to allow the user to select the most appropriate classification that fits the present activity of the subject (e.g., the pet). For example, if the activity monitor device 104 determines a classification of "walking" for a set of sensor data but assigns a low confidence score to that classification, the mobile compute device 102 may present a "walking" classification, a "trotting" classification, a "running" classification, and an "unknown" classification to the user. In response, the user may select the classification that best matches the present activity of the subject (e.g., "trotting" for a trotting pet). In some embodiments, the number of possible classifications may be limited or otherwise reduced to increase the ease at which the user can select an appropriate classification. In this way, the user may assist the system 100 in classifying sensor data having an unknown or low confidence classification. Additionally, such user-assisted learning allows an abbreviated or shorten training period by requesting the user's assistance in establishing initial classifications during an initialization of the system 100.

After the mobile compute device 102 validates or determines the classification of the sensor data, the mobile compute device 102 transmits the classification data to the remote server 106 over the network 108. The remote server 106 aggregates classification data from multiple mobile compute devices 102 and updates a knowledgebase as needed. In this way, the classification of sensor data can be refined or updated using crowd-sourced classifications. In the illustrative embodiment, the classification of the sensor data is further referenced based on the characteristics of the particular subject (e.g., for pet, the breed, gender, age, etc.), allowing further accuracy in refinement of the classification algorithms. If the knowledgebase maintained by the remote server 106 is updated, the remote server 106 may push the updated knowledgebase to the mobile compute device 102, which may update a pattern matching engine or other machine learning logic of the activity monitor device 104 based on the updated knowledgebase. In this way, the classification of the sensor data is improved or refined overtime based on user-assisted and crowd-sourced learning.

The mobile compute device 102 may be embodied as any type of compute device capable of performing the functions described herein. For example, the mobile compute device 102 may be embodied as a smart phone, a smartphone, a wearable compute device, a tablet computer, a laptop computer, a notebook, a netbook, an Ultrabook™, a smart device, a personal digital assistant, a mobile Internet device, and/or any other suitable computing/communication device. It should be appreciated that, although described herein as a mobile device, the mobile compute device 102 may be embodied as a stationary compute device (e.g., a desktop computer) in other embodiments. As shown in FIG. 1, the illustrative mobile compute device 102 includes a processor 110, an input/output ("I/O") subsystem 112, a memory 114, one or more input devices 120, one or more output devices 124, a communication circuit 126, and one or more peripheral devices 122. Of course, the mobile compute device 102 may include other or additional components, such as those commonly found in a typical compute device, in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile compute device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the mobile compute device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the mobile compute device 102, on a single integrated circuit chip.

The input devices 120 may be embodied as any one or more devices capable of providing or receiving an interaction from a user of the mobile compute device 102 and providing an input to the mobile compute device 102 based on such interaction. In the illustrative embodiment, the input devices 120 include a touchscreen 130, which may receive input from the user based on a tactile interaction. Of course, the input devices 120 may include additional or other types of input devices such as a physical or virtual keyboard, buttons, switches, a mouse, and so forth.

The output devices 124 may include, or be embodied as, any type of output device capable of providing information to the user of the mobile compute device. In the illustrative embodiment, the output devices 124 include a display 132 and a speaker 134, but may include additional or other components in other embodiments. The display 132 may be embodied as any type of display capable of displaying information to the user of the mobile compute device 102. For example, the display 132 may be embodied as a liquid crystal display (LCD), a light emitting diode (LED) display, a cathode ray tube (CRT) display, a plasma display, and/or other display device. In some embodiments, the touchscreen 130 may form a portion of the display 132. The speaker 134 may be embodied as any type of audio generation device, such as a speaker or annunciator, capable of producing sound.

The communication circuit 126 may be embodied as any type of communication circuit, device, or collection thereof, capable of enabling communications between the mobile compute device 102 and the smart pet collar 104 and the remote server 106. To do so, the communication circuit 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication. As discussed above, in the illustrative embodiment, the communication circuit 126 is configured to communicate with the smart pet collar 104 via the BLE communication link 180.

In some embodiments, the mobile compute device 102 may also include one or more peripheral devices 122. The peripheral devices 122 may include any number of additional peripheral or interface devices, such as other input/output devices, storage devices, and so forth. The particular devices included in the peripheral devices 122 may depend on, for example, the type and/or intended use of the mobile compute device 102.

As discussed above, the activity monitor device 104 may be embodied as any type of compute device capable of monitoring sensor data indicative of an activity, such as movement or motion, of a subject. In embodiments in which the subject is an animal, such as a pet or human subject, the activity monitor device 104 may be embodied as a smart wearable device such as a smart collar, a smart leash, a smart waistband, smart clothing, smart glasses, or any other device capable of being worn or carried by the animal subject. Alternatively, in embodiments in which the subject is moveable machine such as a robot or autonomous vehicle, the activity monitor device 104 may be embodied as a dedicated monitoring circuit or device, or may be incorporated into other circuits or components of the subject (e.g., incorporated into the control circuit of a robot). However, as discussed above, the illustrative activity monitor device 104 is embodied as a smart pet collar 104. In such embodiments, the smart pet collar 104 may be embodied as any type of compute device capable of incorporation into a collar wearable by a pet (e.g., a dog collar) and capable of performing the functions described herein.

As shown in FIG. 1, the illustrative activity monitor device 104 includes a processor 150, an input/output ("I/O") subsystem 152, a memory 154, one or more sensors 160, a communication circuit 162, and, optionally, peripheral devices 164. Of course, the activity monitor device 104 may include other or additional components, such as those commonly found in an embedded system, in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 150 may be embodied as any type of processor capable of performing the functions described herein. For example, the processor 150 may be embodied as a single or multi-core processor(s), digital signal processor, microcontroller, or other processor or processing/controlling circuit. Similarly, the memory 154 may be embodied as any type of volatile or non-volatile memory or data storage capable of performing the functions described herein. In operation, the memory 154 may store various data and software used during operation of the activity monitor device 104 such as operating systems, applications, programs, libraries, and drivers. The memory 154 is communicatively coupled to the processor 150 via the I/O subsystem 152, which may be embodied as circuitry and/or components to facilitate input/output operations with the processor 150, the memory 154, and other components of the activity monitor device 104. For example, the I/O subsystem 152 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. It should be appreciated that the activity monitor device 104 may be manufactured to have a small foot print and, as such, the processor 150, memory 154, I/O subsystem 152, and/or other components of the activity monitor device 104 may be incorporated into an embedded system, system-on-a-chip (SoC), or other single integrated circuit chip.

The sensors 160 may be embodied as any one or more sensors capable of generating or producing sensor data indicative of a physical activity of the corresponding subject (e.g., a pet, in the illustrative embodiment). For example, in some embodiments, the sensor 160 may include one or more gyroscopes 170, one or more accelerometers 172, and/or a global positioning system (GPS) 174. Of course, in other embodiments, additional or other sensors may be included in the activity monitor device 104 to generate sensor data indicative of the present activity of the pet. Furthermore, in some embodiments, the sensors 160 may include sensors capable of producing other types of sensor data, such as sensor data indicative of the health of the pet (e.g., heart rate, blood pressure, etc.). In embodiments in which the subject is a robot or other movable machine, the sensors 160 may include the gyroscope 170, the accelerometer 172, the GPS 174, as well as other sensors to detect movement of the machine or system including, for example, a camera.

The communication circuit 162 may be embodied as any type of communication circuit, device, or collection thereof, capable of enabling communications between the activity monitor device 104 and the mobile compute device 102. To do so, the communication circuit 162 may be configured to use any one or more communication technologies (e.g., wireless or wired communications) and associated protocols (e.g., Ethernet, Bluetooth®, WiFi®, WiMAX, LTE, 5G, etc.) to effect such communication. Again, as discussed above, the communication circuit 162 is configured to communicate with the mobile compute device 102 via the BLE communication link 180 in the illustrative embodiment.

In some embodiments, the activity monitor device 104 may also include one or more peripheral devices 164. The peripheral devices 164 may include any number of additional peripheral or interface devices, such as other input/output devices, storage devices, and so forth.

The remote server 106 may be embodied as any type of computation or computer device capable of performing the functions described herein including, without limitation, a server, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As such, the remote server 106 may include components commonly found in a server compute device such as processors, memory, I/O subsystems, communication circuits, and/or other devices. The description of such components of the remote server 106 is similar to the corresponding components of the mobile compute device 102 and it not repeated herein for clarity of the description. It should be appreciated that the remote server 106 may be embodied as a single compute device or a collection of distributed compute devices.

The network 108 may be embodied as any type of network capable of facilitating communications between the mobile compute device 102 and the remote server 106. For example, the network 108 may be embodied as, or otherwise include, a wireless local area network (LAN), a wireless wide area network (WAN), a cellular network, and/or a publicly-accessible, global network such as the Internet. As such, the network 108 may include any number of additional devices, such as additional computers, routers, and switches, to facilitate communications thereacross.

Figure 2:
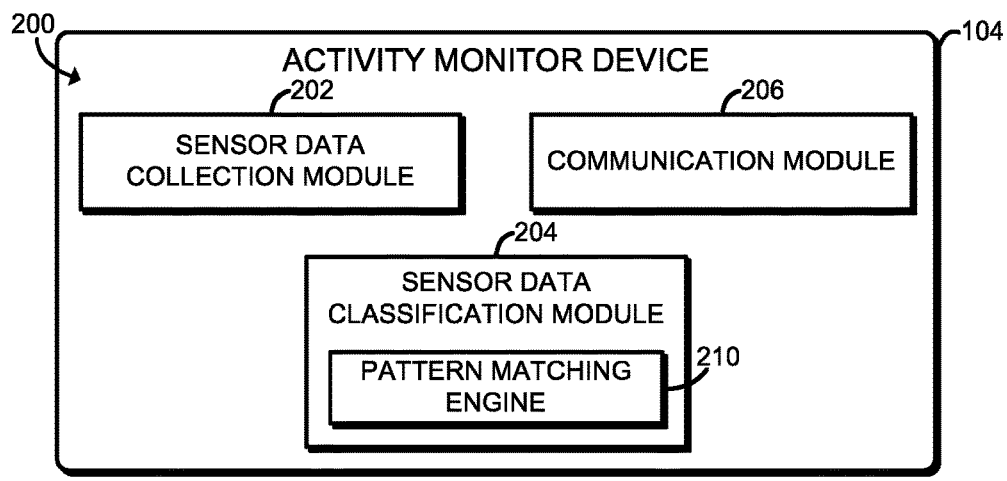
FIG. 2 is a simplified block diagram of at least one embodiment of an environment that may be established by a smart pet collar of the system of FIG. 1.

Referring now to FIG. 2, in the illustrative embodiment, the activity monitor device 104 may establish an environment 200 during operation. The illustrative environment 200 includes a sensor data collection module 202, a sensor data classification module 204, and a communication module 206. Each of the modules, logic, and other components of the environment 200 may be embodied as hardware, firmware, software, or a combination thereof. As such, in some embodiments, one or more of the modules of the environment 200 may be embodied as circuitry or collection of electrical devices (e.g., sensor data collection circuitry 202, sensor data classification circuitry 204, and communication circuitry 206, etc.). It should be appreciated that, in such embodiments, one or more of the sensor data collection circuitry 202, the sensor data classification circuitry 204, and/or the communication circuitry 206 may form a portion of one or more of the processor 150, main memory 154, sensors 160, communication circuit 162, and/or other components of the activity monitor device 104. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 150 or other components of the activity monitor device 104.

The sensor data collection module 202, which may be embodied as hardware, firmware, software, virtualized hardware, emulated architecture, and/or a combination thereof as discussed above, is configured to receive and manage the sensor data produced by the various sensors 160. In some embodiments, the sensor data collection module 202 may aggregate, pre-process, or otherwise prepare the sensor data for classification.

The sensor data classification module 204, which may be embodied as hardware, firmware, software, virtualized hardware, emulated architecture, and/or a combination thereof as discussed above, is configured to determine classification data indicative of a classification of the sensor data. For example, in some embodiments, the sensor data classification module 204 may be embodied as a specialized co-processor or dedicated component (e.g., a SoC) configured to perform the functions described herein. As discussed above, the classification is indicative of an activity presently performed by the subject. For example, in the illustrative embodiment, the classification is indicative of an activity (e.g., "sitting," "running," "trotting," etc.) performed by a corresponding pet. Alternatively, in an embodiment in which the subject is a patient, the classification may be indicative of the movement of the patient (e.g., "walking," steps taken, etc.). For example, if the subject is on an exercise machine, the classification may be indicative of the type of exercise performed. Further, in embodiments in which the subject is a robot, autonomous machine, or other movable machine, the classification may be based on the type of movement (e.g., arm moving left, arm moving right, height adjusted, machine moved forward, etc.). Of course, in yet other embodiments, the classification may be indicative of other aspects of the corresponding subject, such as health characteristics of an animal subject (e.g., a pet). To determine the classification of the received sensor data, the sensor data classification module 204 may utilize any suitable machine learning algorithm, process, and/or technique including, but not limited to clustering algorithms (e.g., unsupervised clustering algorithms such as the K-means clustering algorithm), classification algorithms (e.g., linear discriminant analysis), logistic regressions, support vector machines, and conditional random fields. In the illustrative embodiment, the sensor data classification module 204 includes a pattern matching engine 210 configured to recognize patterns in the sensor data and determine a classification for the sensor data based on the recognized patterns. To do so, as discussed below, the pattern matching engine 210 may be initially trained using user-assisted learning provided by the mobile compute device 102. In some embodiments the pattern matching engine 210 may be embodied as a separate hardware compute component such as a field programmable gate array (FPGA), an application specific integrated circuit, a co-processor, or other hardware device. Alternatively, in some embodiments, the pattern matching engine 210 may be embodied as software executed on the processor 150, for example.

In addition to determining a classification of the sensor data, the pattern matching engine 210 determines a confidence score indicative of a level of confidence of the determined classification of the sensor data. The confidence score may be embodied as any type of data (e.g., a numerical value) capable of providing an indication of the level of confidence of the determined classification. For example, if the pattern matching engine 210 determines that the sensor data has a high degree of correlation to a particular classification, the pattern matching engine 210 may assign a high value confidence score. Likewise, if the pattern matching engine 210 determines that the sensor data has a low degree of correlation, the pattern matching engine 210 may assign a low value confidence score. Furthermore, if the pattern matching engine 210 determines that the sensor data does not match any classification pattern, the pattern matching engine 210 may determine that the classification of that particular sensor data is unknown (e.g., a new activity of the pet or a new movement of a robotic arm may been detected).

The communication module 206, which may be embodied as hardware, firmware, software, virtualized hardware, emulated architecture, and/or a combination thereof as discussed above, is configured to establish communications with the mobile compute device 102. As discussed above, in the illustrative embodiment, the communication module 206 communicates with the mobile compute device 102 over the short range communication link 180, which may be embodied as a Bluetooth® low energy (BLE) communication link. In use, the communication module 206 is configured to transmit the determined classification data to the mobile compute device 102 and respond to requests, such as requests for the raw sensor data as discussed below.

Figure 3:
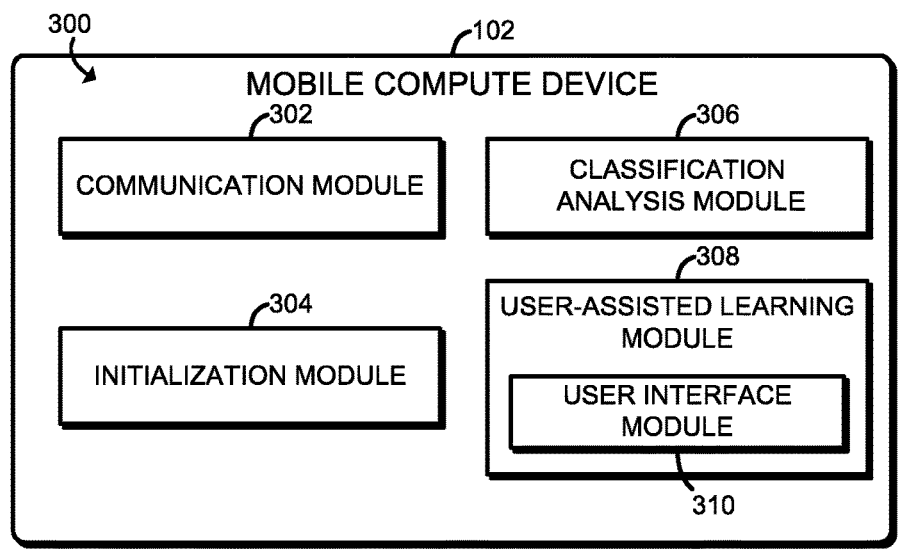
FIG. 3 is a simplified block diagram of at least one embodiment of an environment that may be established by a mobile compute device of the system of FIG. 1.

Referring now to FIG. 3, in the illustrative embodiment, the mobile compute device 102 may establish an environment 300 during operation. The illustrative environment 200 includes a communication module 302, an initialization module 304, a classification analysis module 306, and a user-assisted learning module 308. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., communication circuitry 302, initialization circuitry 304, classification analysis circuitry 306, and user-assisted learning circuitry 308, etc.). It should be appreciated that, in such embodiments, one or more of the communication circuitry 302, the initialization circuitry 304, the classification analysis circuitry 306, and/or the user-assisted learning circuitry 308 may form a portion of one or more of the processor 110, main memory 114, input device 120, output devices 124, communication circuit 126, and/or other components of the mobile compute device 102. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 110 or other components of the mobile compute device 102.

The communication module 302, which may be embodied as hardware, firmware, software, virtualized hardware, emulated architecture, and/or a combination thereof as discussed above, is configured to establish communications with the activity monitor device 104 and the remote server 106. As discussed above, in the illustrative embodiment, the mobile compute device 102 communicates with the smart pet collar over the short range communication link 180, which may be embodied as a Bluetooth® low energy (BLE) communication link. Additionally, the mobile compute device 102 communicates with the remote server 106 over the network 108. As discussed in more detail below, the communication module 206 is configured to receive the classification data from activity monitor device 104 and transmit the classification data to the remote server 106 after analysis. Additionally, the communication module 302 may communicate with the activity monitor device 104 to receive raw sensor data, which is transmitted to the remote server 106. Furthermore the communication module 302 may receive updates to a machine learning knowledgebase from the remote server 106 and pass along those updates to the activity monitor device 104.

The initialization module 304, which may be embodied as hardware, firmware, software, virtualized hardware, emulated architecture, and/or a combination thereof as discussed above, is configured to perform various initialization procedures of the mobile compute device 102. For example, when the system 100 is used with a new subject, the initialization module 304 is configured to obtain identification information about the particular subject (e.g., the particular pet). For example, in embodiments in which the activity monitor device 104 is a smart pet collar 104, the initialization module 304 may prompt the user of the mobile compute device 102 to supply pet identification information such as the breed, gender, neuter state, age, weight, and/or other physical characteristics of the pet, which may be used by the system 100 to improve the classification of the sensor data. For example, sensor data from a small, short haired pet may be quite different from sensor data from a large, long haired pet for the same activity (e.g., long fur may dampen certain sensor signals). To collect the identification data, the initialization module 304 may present a suitable user interface to the user on the display 132. The initialization module 304 may also walk the user through an initial training period by, for example, requesting the user control the subject (e.g., pet) to perform specific activities (e.g., walk, run, etc.) while recording the corresponding sensor data. That is, such activities may initially be marked as an unknown classification by the activity monitor device 104, which is updated by the mobile compute device 102 based on the training period.

The classification analysis module 306, which may be embodied as hardware, firmware, software, virtualized hardware, emulated architecture, and/or a combination thereof as discussed above, is configured to analyze the classification data received from the activity monitor device 104. In the illustrative embodiment, the classification analysis module 306 analyzes the associated confidence score to determine whether user assistance is needed to help classify the associated sensor data. For example, the classification analysis module 306 determines that the confidence score is below a reference threshold value or if the classification is reported as being unknown, the classification analysis module 306 may instruct the user-assisted learning module 308 to request assistance from the user as discussed below. In doing so, the classification analysis module 306 or user-assisted learning module 308 may request the associated raw sensor data from the activity monitor device 104. If, however, the classification analysis module 306 determines that the confidence score of the associated classification is greater than the threshold value, the classification analysis module 306 may cooperate with the communication module 302 to transmit the classification to the remote server 106 as a validated classification.

Figure 4:
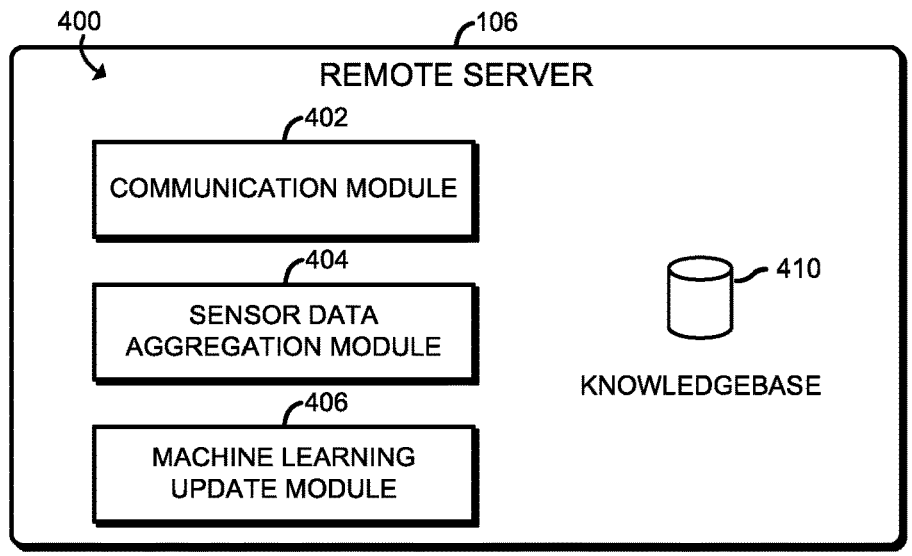
FIG. 4 is a simplified block diagram of at least one embodiment of an environment that may be established by a remote server of the system of FIG. 1.

The user-assisted learning module 308, which may be embodied as hardware, firmware, software, virtualized hardware, emulated architecture, and/or a combination thereof as discussed above, is configured to request assistance from the user of the mobile compute device 102 to help classify associated sensor data. That is, as discussed above, if the classification data received from the activity monitor device 104 indicates an unknown classification of the sensor data or a classification having an associated low confidence score, the user-assisted learning module 308 is configured to request assistance from the user to identify or confirm the classification. To do so, the user-assisted learning module 308 includes a user interface module 310 configured to display various possible classifications to the user on the display 132. The user may select the classification that best matches the activity being performed by the subject (e.g., pet) that produced the sensor data in question. To improve the ease of classification by the user, the user-assisted learning module 308 may limit the number of choices presented by the user and include an "unknown" or "other" classification choice. For classifications that have a low confidence score, the user-assisted learning module 308 may include the initially assigned classification in the list of possible choices to allow the user to confirm that classification Referring now to FIG. 4, in the illustrative embodiment, the remote server 104 may establish an environment 400 during operation. The illustrative environment 400 includes a communication module 402, a sensor data aggregation module 404, and a machine learning update module 406. Each of the modules, logic, and other components of the environment 400 may be embodied as hardware, firmware, software, or a combination thereof. As such, in some embodiments, one or more of the modules of the environment 400 may be embodied as circuitry or collection of electrical devices (e.g., communication circuitry 402, sensor data aggregation circuitry 404, and machine learning update circuitry 406, etc.). It should be appreciated that, in such embodiments, one or more of the communication circuitry 402, the sensor data aggregation circuitry 404, and/or the machine learning update circuitry 406 may form a portion of one or more of the processor, main memory, and/or other components of the remote server 104. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor or other components of the remote server 106.

The communication module 402, which may be embodied as hardware, firmware, software, virtualized hardware, emulated architecture, and/or a combination thereof as discussed above, is configured to establish communications with the mobile compute device 102 over the network 108. As discussed above, the communication module 402 may receive the classification data and/or other information from the mobile compute device 102 and communicate updates to the mobile compute device 102.

The sensor data aggregation module 404, which may be embodied as hardware, firmware, software, virtualized hardware, emulated architecture, and/or a combination thereof as discussed above, is configured to collect sensor data from the various mobile compute devices 102 of the system 100 and aggregate the sensor data. For example, sensor data received from multiple mobile compute devices 102 related to similar subjects (e.g., in the case of pets, the same breed, size, gender, etc.) may be aggregated together. The classification data may be used to update or refine the classification rules as discussed below.

The machine learning update module 406, which may be embodied as hardware, firmware, software, virtualized hardware, emulated architecture, and/or a combination thereof as discussed above, is configured to manage a knowledgebase 410, which may include or otherwise be embodied as a set of classification rules usable by the pattern matching engine 210 (or other machine learning module) of the activity monitor device 104 to classify sensor data. In use, the machine learning update module 406 is configured to update and/or refine the knowledgebase 410 based on the classification data received from the mobile compute devices 102. For example, the machine learning update module 406 may refine the classification rules of the knowledgebase 410 based on received classification data that indicates a validated classification (e.g., a classification having a high confidence score and/or a confirmed classification (e.g., a classification having a low confidence score that has been confirmed by the user). Additionally, if the classification data received from the mobile compute device 102 indicates a new activity, the machine learning update module 406 may update the classification rules of the knowledgebase 410 to include rules identifying the new activity (e.g., a range of sensor data that indicate the new activity).

Figure 5:
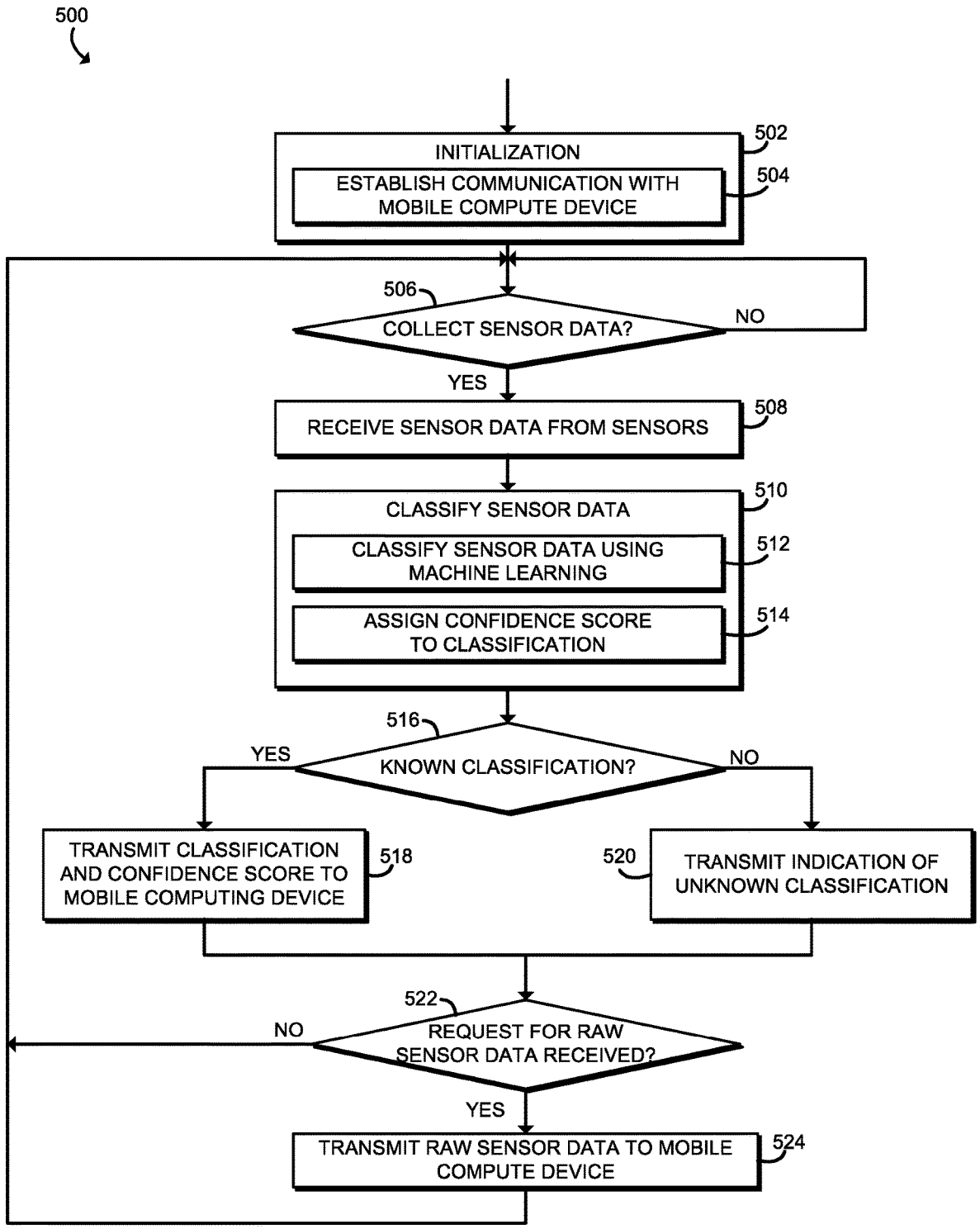
FIG. 5 is a simplified flow diagram of at least one embodiment of a method for classifying sensor data that may be executed by the smart pet collar of FIGS. 1 and 2.

Referring now to FIG. 5, in use, the activity monitor device 104 may execute a method 500 for classifying sensor data. The method 500 begins with block 502 in which the activity monitor device 104 performs various initialization procedures. For example, in block 504, the activity monitor device 104 may establish the communication link 180 with the mobile compute device 102. Additionally, the activity monitor device 104 may perform various validation checks during block 502.

In block 506, the activity monitor device 104 determines whether to collect sensor data from the sensors 160. In some embodiments, the activity monitor device 104 may be configured to periodically sample the sensor data, poll the sensors 160, and/or otherwise obtain the sensor data continuously, periodically, or responsively. If the activity monitor device 104 determines to collect the sensor data, the method 500 advances to block 508 in which the sensor data from the sensors 160 is received or otherwise collected.

In block 510, the activity monitor device 104 classifies the received sensor data. To do so, in block 512, the activity monitor device 104 classifies the sensor data using a machine learning algorithm in block 512. As discussed above, the activity monitor device 104 may utilize any suitable machine learning algorithm to classify the sensor data including, but not limited to, to clustering algorithms (e.g., unsupervised clustering algorithms such as the K-means clustering algorithm), classification algorithms (e.g., linear discriminant analysis), logistic regressions, support vector machines, and conditional random fields. In the illustrative embodiment, the activity monitor device 104 utilizes a pattern matching algorithm to classify the sensor data. Additionally, in block 514, the activity monitor device 104 assigns a confidence score to the determined classification. As discussed above, the confidence score may be embodied as any type of data (e.g., a numerical value) indicative of the level of confidence of the assigned classification.

In some cases, the sensor data may not correlate to any existing classifications. As such, in block 516, the activity monitor device 104 determines whether the classification is known (i.e., whether the sensor data was able to be classified, even with a low confidence score). If so, the classification is known, the method 500 advances to block 518 in which the activity monitor device 104 transmits classification data, including the classification and the associated confidence score, to the mobile compute device 104. If, however, the classification is unknown in block 516, the method 500 advances to block 520 in which the activity monitor device 104 transmits an indication of an unknown classification to the mobile compute device 102. In either case, the method 500 subsequently advances to block 522.

In block 522, the activity monitor device 104 determines whether a request for the raw sensor data used to determine the assigned classification is received from the mobile compute device 102. As discussed in more detail below, the mobile compute device 102 may request the raw sensor data in those cases in which the classification is unknown or has a low confidence score. If a request is received, the method 500 advances to block 524 in which the smart pet collar 104 transmits the requested raw sensor data to the mobile compute device 102. The method 500 subsequently loops back to block 506 in which the activity monitor device 104 determines whether to collect additional sensor data from the sensors 160.

Figure 6:
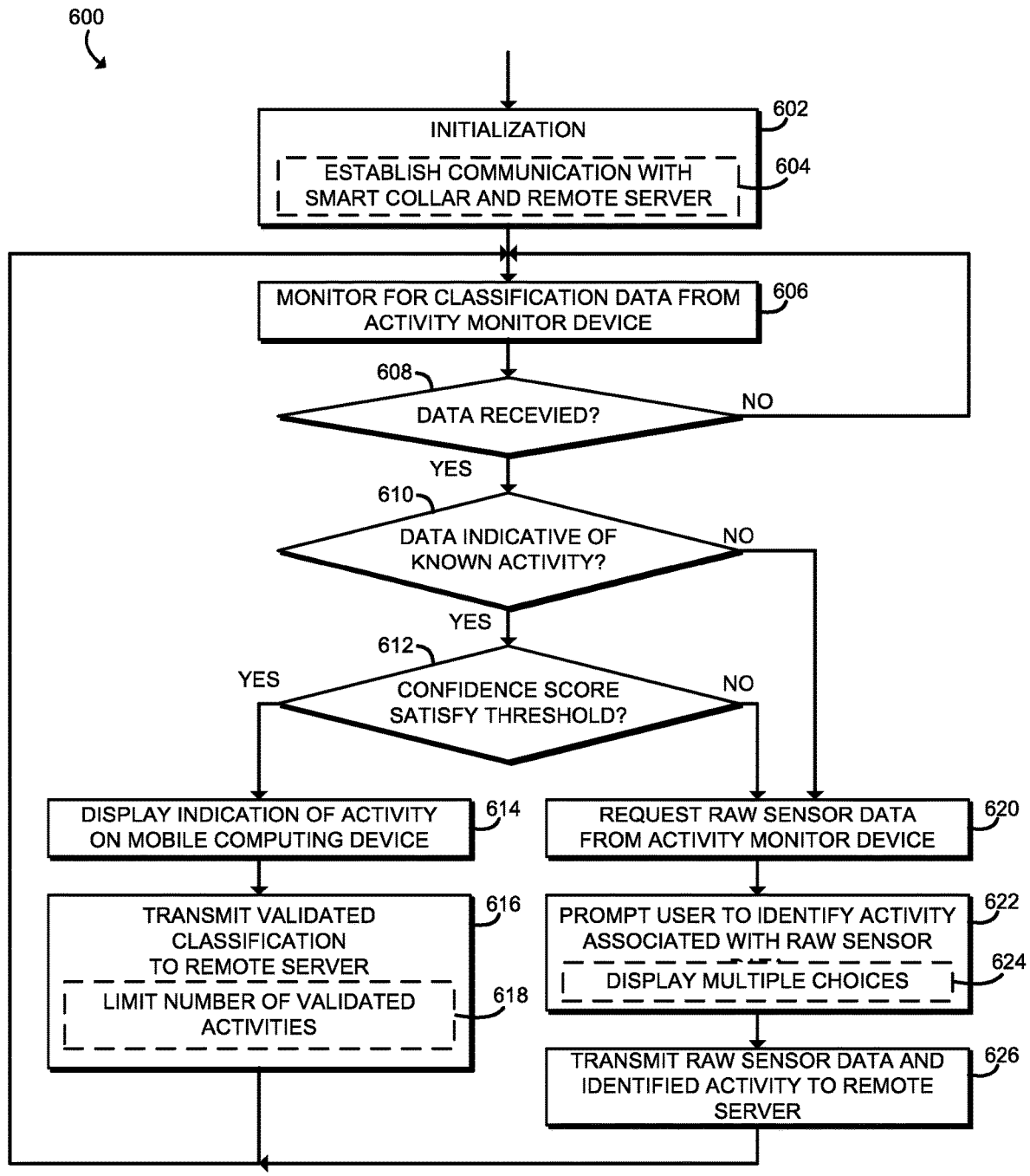
FIG. 6 is a simplified flow diagram of at least one embodiment of a method for user assisted machine learning that may be executed by the mobile computing device of FIGS. 1 and 3.

Referring now to FIG. 6, in use, the mobile compute device 102 may execute a method 600 for user-assisted machine learning. The method 600 begins with block 602 in which the mobile compute device 102 performs various initialization procedures. For example, in block 604, the mobile compute device 102 may establish the communication link 180 with the activity monitor device 104 and establish a communication link with the remote server 106 over the network 108. Additionally, in block 602, the mobile compute device 102 may walk the user through an initial training period. For example, as discussed above, the mobile compute device 102 may request that the user control the subject to perform specific activities (e.g., in the case of a pet, to walk the pet, run the pet, etc.) while recording the classification data received from the activity monitor device 104 to thereby establish a base set of classifications.

After the mobile compute device 102 has been initialized in block 602, the mobile compute device 102 monitors for classification data from the activity monitor device 104 in block 606. In some embodiments, the activity monitor device 104 may be configured to continuously, periodically, or responsively transmit the classification data. For example, in some embodiments, the mobile compute device 102 may poll the activity monitor device 104 to receive the classification data.

In block 608, the mobile compute device 102 determines whether classification data has been received. If not, the method 600 loops back to block 606 to continue monitoring for classification data from the activity monitor device 104. If, however, classification data has been received, the method 600 advances to block 610. In block 610, the mobile compute device 102 determines whether the classification data indicates a known or unknown classification. If the classification is unknown, the method 600 advances to block 620 discussed below. If, however, the classification is known, the method 600 advances to block 612 in which the mobile compute device 102 determines whether the confidence score associated with the known classification satisfies a reference threshold value (e.g., whether the confidence score is greater than a minimum threshold value). If so, the method 600 advances to block 614.

In block 614, the mobile compute device 102 displays an indication of the activity associated with the assigned classification to a user on the display 132. For example, if the subject is a pet and the classification indicates the pet is running, the mobile compute device 102 may display a graphic of a pet running or display the word "running" on the display 132. The method 600 subsequently advances to block 616 in which the mobile compute device 102 transmits the validated classification data to the remote server 106. In some embodiments, in block 618, the mobile compute device 102 may limit the number of transmissions of validated classifications so as not to overload the remote server 106. The method 600 subsequently loops back to block 606 in which the mobile compute device 102 continues to monitor for new classification data from the activity monitor device 104.

Referring back to blocks 610 and 612, if the classification is unknown or has a low confidence score, the mobile compute device 102 requests assistance from the user to help classify the sensor data. To do so, the method 600 advances from block 610, 612 to block 620 in which the mobile compute device 102 requests the raw sensor data associated with the classification from the smart pet collar 104. In block 622, the mobile compute device 102 prompts the user to identify the activity associated with the raw sensor data. For example, in block 624, the mobile compute device 102 may display a number of possible classification choices to the user on the display 132. As discussed above, the user may then select the classification that best matches the activity being performed by the subject that produced the sensor data in question. To improve the ease of classification by the user, the number of displayed choices may be limited and may include an "unknown" or "other" classification choice. If the classification was determined to have a low confidence score in block 612, the displayed classification choices may include the initially assigned classification, which the user may select to verify the assigned classification.

After the user has selected the activity classification from the displayed choices in block 622, the method advances to block 626 in which the mobile compute device 102 transmits the raw sensor data received from the activity monitor device 104 in block 620 and the activity classification selected by the user in block 626 to the remote server 106. The method 600 subsequently loops back to block 606 in which the mobile compute device 102 continues to monitor for new classification data from the activity monitor device 104.

Figure 7:
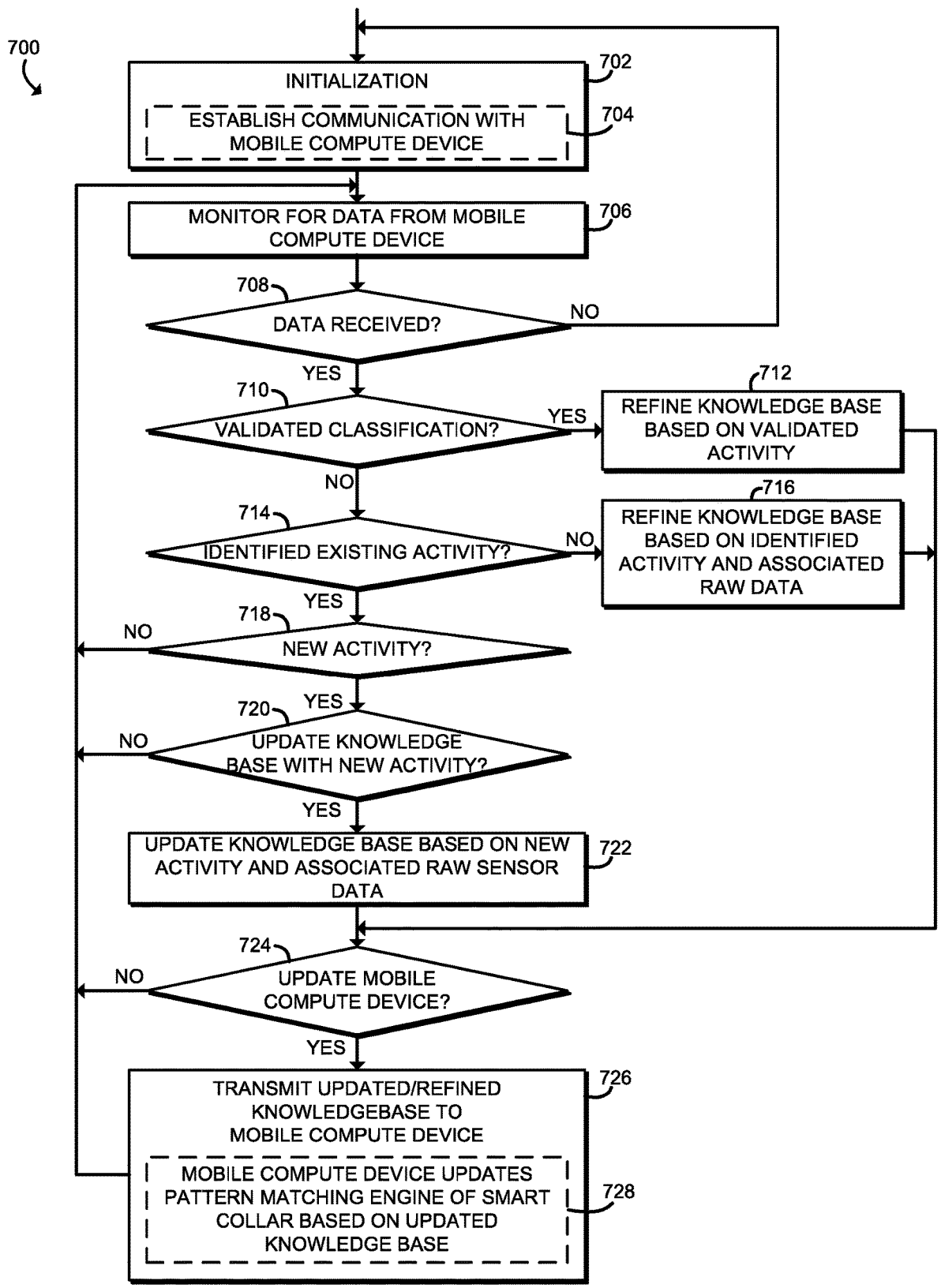
FIG. 7 is a simplified flow diagram of at least one embodiment of a method for managing a knowledgebase that may be executed by the remote server of FIGS. 1 and 4.

Referring now to FIG. 7, in use, the remote server 106 may execute a method 700 for managing a machine learning knowledgebase. The method 700 begins with block 702 in which the remote server 106 performs various initialization procedures. For example, in block 704, the remote server 106 may establish a communication link with the mobile compute device 102 over the network 108.

After the remote server 106 has been initialized in block 702, the remote server 106 monitors for classification data from the mobile compute device 102 in block 706. In block 708, the remote server 106 determines whether classification data has been received. If not, the method 700 loops back to block 706 to continue monitoring for classification data from the mobile compute device 102. If, however, classification data has been received, the method 700 advances to block 710. In block 710, the remote server 106 determines whether the classification data indicates a validated classification. That is, the remote server 106 determines whether the classification has a confidence score that satisfies the threshold value. If so, the method 700 advances to block 712 in which the remote server 106 refines the knowledgebase 410 based on the validated classification. For example, the remote server 106 may adjust or modify classification rules based on the validated classification. After the knowledgebase 410 has been refined, the method 700 advances to block 724 discussed below.

If, however, the remote server 106 determines that the classification is not validated (e.g., the classification has a low confidence score or has been determined via user assistance), the method 700 advances to block 714. In block 714, the remote server 106 determines whether the classification data indicates a known activity of the subject. If a known activity has been identified (i.e., the sensor data has been classified as an existing activity), the method 700 advances to block 716 in which the remote server 106 refines the knowledgebase 410 based on the classified activity and the associated raw sensor data. For example, the remote server 106 may adjust or modify classification rules based on the classification and corresponding raw sensor data. After the knowledgebase 410 has been refined, the method 700 advances to block 724 discussed below.

If, however, the remote server 106 determines that identified activity is not an activity currently existing in knowledgebase 410 in block 714, the method 700 advances to block 718. In block 718, the remote server 106 determines whether the classification data indicates a new activity. If not (e.g., the classification indicates an unknown activity), the method 700 loops back to block 706 to continue monitoring for classification data from the mobile compute device 102. If, however, the classification data indicates a new activity, the method 700 advances to block 720 in which the remote server 106 determines whether to update the knowledgebase 410 with the new activity. If so, the method 700 advances to block 722 in which the remote server 106 updates the knowledgebase 410 with the new activity and associated raw sensor data. For example, the remote server 106 may update or modify classification rules based on the new activity and associated raw sensor data.

After the knowledgebase 410 has been updated, the method 700 advances to block 724. In block 724, the remote server 106 determines whether to update the mobile compute device with the updated or refined knowledgebase 410. For example, the remote server 106 may push knowledgebase 410 updates continuously, periodically or responsively. If the remote server 106 determines to update the mobile compute device 102, the method 700 advances to block 726 in which the remote server 106 transmits the updated or refined knowledgebase 410 to the mobile compute device 102 over the network 108. In response, the mobile compute device 102 may update the pattern matching engine 210 (or other machine learning module) of the activity monitor device 104 based on the updated/refined knowledgebase 410 over the communication link 180. The method 700 subsequently loops back to loops back to block 706 to continue monitoring for classification data from the mobile compute device 102.

Figure 8:
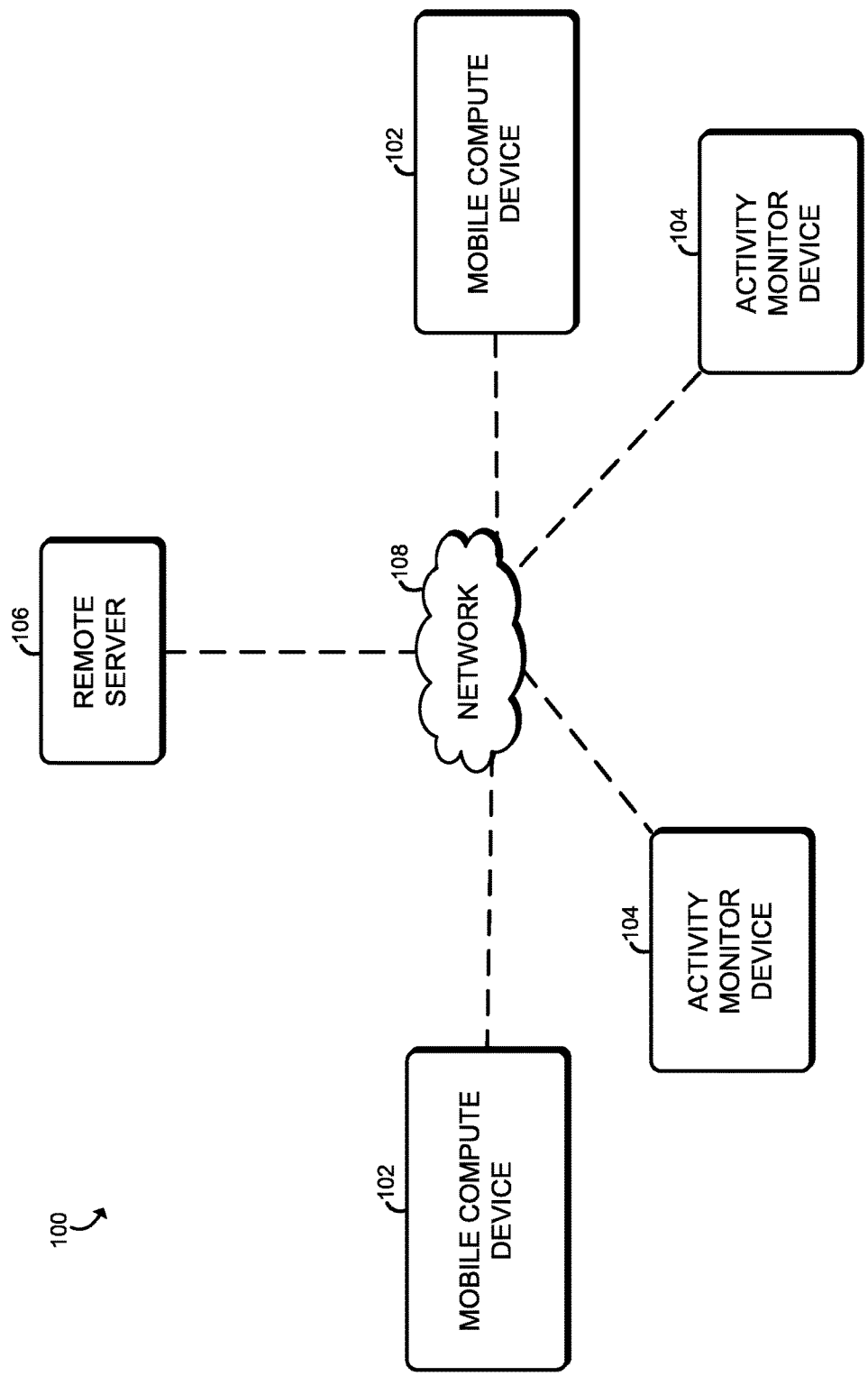
FIG. 8 is a simplified block diagram of another embodiment of the system of FIG. 1 for user assisted machine learning.

Referring now to FIG. 8, in some embodiments, the various mobile compute devices 102 and activity monitor devices 104 may communicate with each other via the remote server 106 instead of, or in addition to, the short ranged communication link 180. For example, in such embodiments, the activity monitor device 104 may transmit the classification data to the corresponding mobile compute device 102 by transmitting the classification to the remote server 106 over the network 108. In turn, the remote server 106 transmits the classification data to the mobile compute device 102 to facilitate the user-assisted learning as needed and described above. Similarly, the mobile compute device 102 may communicate with the corresponding activity monitor device 104 (e.g., to request raw sensor data) by communicating directly with the remote server 106, which in turn communicates with the activity monitor device 104 to facilitate the indirect communication between the mobile compute device 102 and the activity monitor device 104. In such embodiments, the mobile compute device 102 and the activity monitor device 104 may or may not communicate directly with each other. Furthermore, in some embodiments, the classification process described as being performed by the activity monitor device 104 (see, e.g., block 510 of the method 500) may be offloaded to the remote server 106 in some embodiments. For example, in embodiment in which the activity monitor device 104 is designed as a low-power or low-feature sensing device, the activity monitor device 104 may simply transmit the sensor data to the server 106 for classification thereon.

Figure 9:
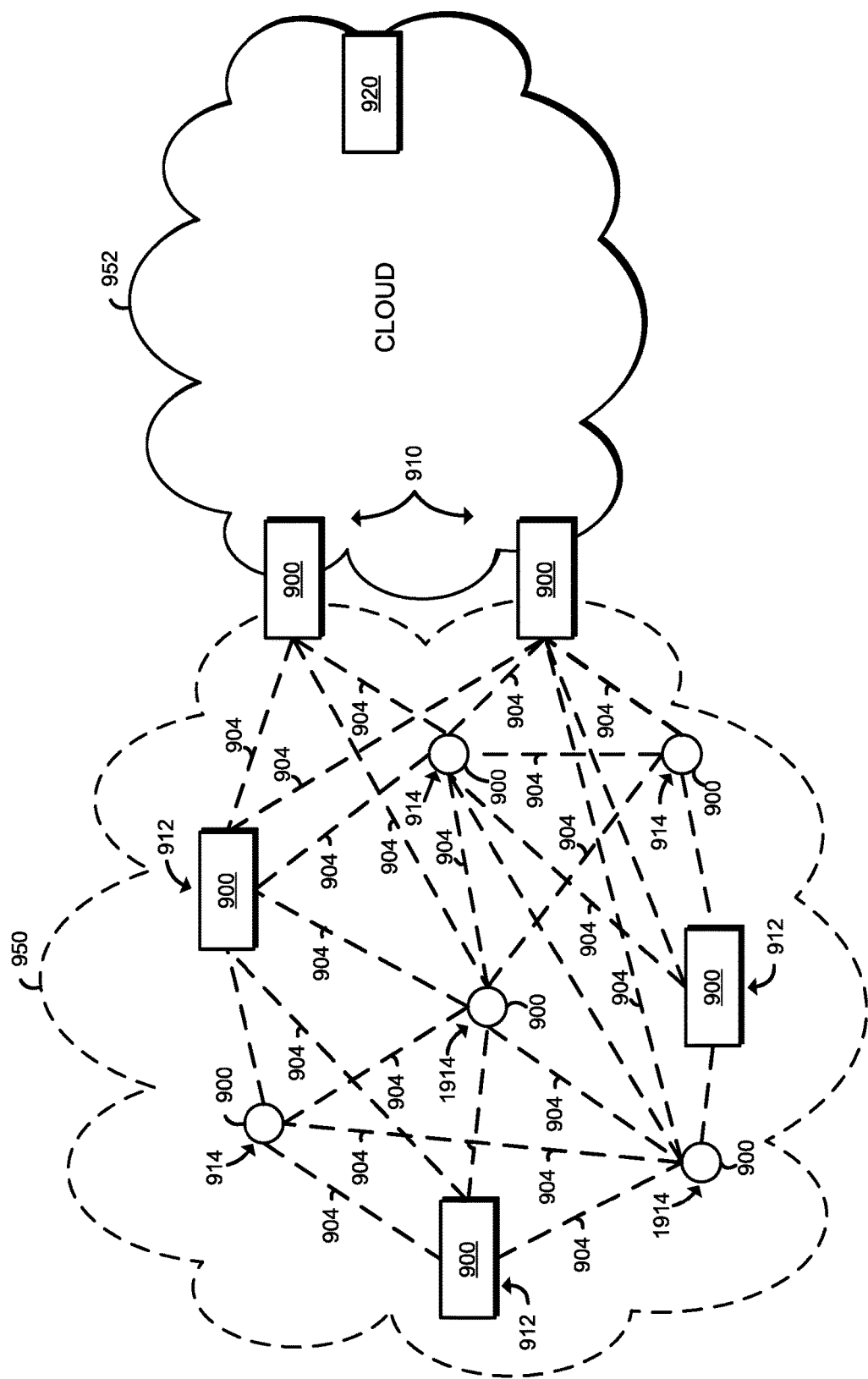
FIG. 9 is a simplified block diagram of another embodiment of the system of FIG. 1 having devices arranged in a mesh network.

Referring now to FIG. 9, in some embodiments, some or all of the activity monitor devices 104 and/or mobile compute device 106 may be embodied as Internet-of-Things devices 1900 and form, potentially with other devices, a mesh network, which may be termed as a fog 950, operating at the edge of a cloud network 952. The fog 950 may be considered to be a massively interconnected network wherein a number of IoT devices 1900 are in communications with each other, for example, by radio links 904 (all of which are not labeled in FIG. 9 to simplify the figure and for clarify). This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 900 are shown in the example embodiment of FIG. 9, gateways 910, data aggregators 912 (e.g., mobile compute devices 102), and sensors 1914 (e.g., activity monitor devices 104), although any combinations of IoT devices 900 and functionality may be used. The gateways 910 may be edge devices that provide communications between the cloud 952 and the fog 950, and may also provide the backend process function for data obtained from sensors 914. The data aggregators 912 may collect data from any number of the sensors 914, and perform the back end processing function for the analysis (e.g., requesting user assistance to classify sensor data). The results, raw data, or both may be passed along to the cloud 952 through the gateways 910. The sensors 914 may be full IoT devices 900, for example, capable of both collecting data and processing the data. In some cases, the sensors 914 may be more limited in functionality, for example, collecting the data and allowing the data aggregators 912 or gateways 910 to process the data.

Communications from any IoT device 900 may be passed along the most convenient path between any of the IoT devices 900 to reach the gateways 910. In these networks, the number of interconnections provide substantial redundancy, allowing communications to be maintained, even with the loss of a number of IoT devices 900. Further, the use of a mesh network may allow IoT devices 900 that are very low power or located at a distance from infrastructure to be used, as the range to connect to another IoT device 900 may be much less than the range to connect to the gateways 910.

The fog 950 of the IoT devices 900 devices may be presented to devices in the cloud 952, such as a server 920 (which may be embodied as the remote server 106), as a single device located at the edge of the cloud 952, e.g., a fog 950 device. In this example, the classification data coming from the fog 950 device may be sent without being identified as coming from a specific IoT device 1900 (e.g., a specific smart pet collar 104) within the fog 950.

In some examples, the IoT devices 900 may be configured using an imperative programming style, e.g., with each IoT device 900 having a specific function and communication partners. However, the IoT devices 900 forming the fog 950 device may be configured in a declarative programming style, allowing the IoT devices 900 to reconfigure their operations and communications, such as to determine needed resources in response to conditions, queries, and device failures. The data from these sensors 914 may then be aggregated and analyzed by any combination of the sensors 914, data aggregators 912, or gateways 910, before being sent on by the fog 950 device to the server 920 to answer the query. In this example, IoT devices 900 in the fog 950 may select the sensors 914 used based on the query. Further, if some of the IoT devices 900 are not operational, other IoT devices 900 in the fog 1950 device may provide analogous data, if available.

It should be appreciated that the user-assisted machine learning technologies disclosed herein have been primarily described in reference to a particular use-case related to the monitoring of activities of a pet. However, it should be appreciated that the disclosed user-assisted machine learning technologies are applicable to any system, device, or service utilizing a machine learning algorithm. In such embodiments, the user may be prompted to verify or supply classifications or other determinations. As such, the present disclosure should not be interpreted as limited to the specifically disclosed use-case of monitoring pet activity, but rather understood to be applicable to other systems, devices, and services in which machine learning is used. For example, the disclosed technologies may be used to monitor the activity of patients, children, exercise practitioners, robots, autonomous vehicles, drones, machinery, and/or other animals or devices/systems capable of movement.

EXAMPLES

Illustrative examples of the technologies disclosed herein are provided below. An embodiment of the technologies may include any one or more, and any combination of, the examples described below.

Example 1 includes compute device for user-assisted machine learning. The compute device includes a communication logic to obtain classification data indicative of a classification of sensor data generated from one or more sensors, wherein the classification data includes a confidence score indicative of a level of confidence of the classification of the sensor data; a sensor data analyzer to determine whether the confidence score of the classification of the sensor data satisfies a threshold value; and a user-assisted learning logic to request, in response to a determination that the confidence score does not satisfy the threshold value, assistance from a user of the compute device to classify the sensor data.

Example 2 includes the subject matter of Example 1, and wherein to obtain the classification data comprises to receive the classification data from a smart pet collar.

Example 3 includes the subject matter of Example 1 or 2, and wherein to obtain the classification data comprises to receive classification data indicative of an activity of a pet.

Example 4 includes the subject matter of any of Examples 1-3, and further comprising a display, and wherein the user-assisted learning logic is further to display, in response to a determination that the confidence score does satisfy the threshold value, an indication of an activity of the pet on the display.

Example 5 includes the subject matter of any of Examples 1-4, and further comprising a display, and wherein to request assistance from the user comprises to display a plurality of classifications for the sensor data on the display; and receive, from the user, a selection of one of the plurality of classifications.

Example 6 includes the subject matter of any of Examples 1-5, and wherein the communication logic is further to receive raw sensor data corresponding to the sensor data.

Example 7 includes the subject matter of any of Examples 1-6, and wherein the user-assisted learning logic is further to determine an assigned classification of the sensor data based on the selection received from the user and the raw sensor data.

Example 8 includes the subject matter of any of Examples 1-7, and wherein the communication logic is further to transmit the assigned classification and the raw sensor data to a remote server.

Example 9 includes the subject matter of any of Examples 1-8, and wherein the communication logic is further to request raw sensor data corresponding to the sensor data in response to a determination that the confidence score does not satisfy the threshold value.

Example 10 includes the subject matter of any of Examples 1-9, and wherein the communication logic is further to transmit, in response to a determination that the confidence score does satisfy the threshold value, the confidence data to a remote server.

Example 11 includes the subject matter of any of Examples 1-10, and wherein the sensor data analyzer is further to determine, based on the classification data, whether the classification of the sensor data is unknown, and the user-assisted learning logic is further to request, in response to a determination that the classification is unknown, assistance from the user of the compute device to classify the sensor data.

Example 12 includes the subject matter of any of Examples 1-11, and further comprising a display, and wherein to request assistance from the user comprises to display a plurality of classifications for the sensor data on the display; and receive, from the user, a selection of one of the plurality of classifications.

Example 13 includes the subject matter of any of Examples 1-12, and wherein the communication logic is further to request raw sensor data corresponding to the sensor data in response to a determination that the classification is unknown; and the user-assisted learning logic is further to determine an assigned classification of the sensor data based on the selection received from the user and the raw sensor data.

Example 14 includes the subject matter of any of Examples 1-13, and wherein the communication logic is further to transmit the assigned classification and the raw sensor data to a remote server.

Example 15 includes a method for user-assisted machine learning. The method comprising obtaining, by a compute device, classification data indicative of a classification of sensor data generated from one or more sensors, wherein the classification data includes a confidence score indicative of a level of confidence of the classification of the sensor data; determining, by the compute device, whether the confidence score of the classification of the sensor data satisfies a threshold value; and requesting, by the compute device and in response to a determination that the confidence score does not satisfy the threshold value, assistance from a user of the compute device to classify the sensor data.

Example 16 includes the subject matter of Example 15, and wherein obtaining the classification data comprises receiving the classification data from a smart pet collar.

Example 17 includes the subject matter of Example 15 or 16, and wherein obtaining the classification data comprises receiving classification data indicative of an activity of a pet.

Example 18 includes the subject matter of any of Examples 15-17, and further comprising displaying, in response to a determination that the confidence score does satisfy the threshold value, an indication of an activity of the pet on a display of the compute device.

Example 19 includes the subject matter of any of Examples 15-18, and wherein requesting assistance from the user comprises displaying, on a display of the compute device, a plurality of classifications for the sensor data; and receiving, from the user, a selection of one of the plurality of classifications.

Example 20 includes the subject matter of any of Examples 15-19, and further comprising receiving, by the compute device, raw sensor data corresponding to the sensor data.

Example 21 includes the subject matter of any of Examples 15-20, and further comprising determining an assigned classification of the sensor data based on the selection received from the user and the raw sensor data.

Example 22 includes the subject matter of any of Examples 15-21, and further comprising transmitting the assigned classification and the raw sensor data to a remote server.

Example 23 includes the subject matter of any of Examples 15-22, and further comprising requesting, by the compute device, raw sensor data corresponding to the sensor data in response to a determination that the confidence score does not satisfy the threshold value.

Example 24 includes the subject matter of any of Examples 15-23, and further comprising transmitting, in response to a determination that the confidence score does satisfy the threshold value, the confidence data to a remote server.

Example 25 includes the subject matter of any of Examples 15-24, and further comprising determining, by the compute device and based on the classification data, whether the classification of the sensor data is unknown, and requesting, by the compute device and in response to a determination that the classification is unknown, assistance from the user of the compute device to classify the sensor data.

Example 26 includes the subject matter of any of Examples 15-25, and, wherein requesting assistance from the user comprises displaying, on a display of the compute device, a plurality of classifications for the sensor data; and receiving, from the user, a selection of one of the plurality of classifications.

Example 27 includes the subject matter of any of Examples 15-26, and further comprising requesting, by the compute device, raw sensor data corresponding to the sensor data in response to a determination that the classification is unknown; and determining an assigned classification of the sensor data based on the selection received from the user and the raw sensor data.

Example 28 includes the subject matter of any of Examples 15-27, and further comprising transmitting the assigned classification and the raw sensor data to a remote server.

Example 29 includes one or more machine-readable storage media comprising a plurality of instructions stored thereon that, when executed, cause a compute device to perform the method of any of Examples 15-28.

Example 30 includes a compute device for user-assisted machine learning. The compute device comprises means for obtaining classification data indicative of a classification of sensor data generated from one or more sensors, wherein the classification data includes a confidence score indicative of a level of confidence of the classification of the sensor data; means for determining whether the confidence score of the classification of the sensor data satisfies a threshold value; and means for requesting, in response to a determination that the confidence score does not satisfy the threshold value, assistance from a user of the compute device to classify the sensor data.

Example 31 includes the subject matter of Example 30, and wherein the means for obtaining the classification data comprises means for receiving the classification data from a smart pet collar.

Example 32 includes the subject matter of Example 30 or 31, and wherein the means for obtaining the classification data comprises means for receiving classification data indicative of an activity of a pet.

Example 33 includes the subject matter of any of Examples 30-32, and further comprising means for displaying, in response to a determination that the confidence score does satisfy the threshold value, an indication of an activity of the pet on a display of the compute device.

Example 34 includes the subject matter of any of Examples 30-33, and wherein the means for requesting assistance from the user comprises means for displaying a plurality of classifications for the sensor data; and means for receiving, from the user, a selection of one of the plurality of classifications.

Example 35 includes the subject matter of any of Examples 30-34, and further comprising means for receiving raw sensor data corresponding to the sensor data.

Example 36 includes the subject matter of any of Examples 30-35, and further comprising means for determining an assigned classification of the sensor data based on the selection received from the user and the raw sensor data.

Example 37 includes the subject matter of any of Examples 30-36, and further comprising means for transmitting the assigned classification and the raw sensor data to a remote server.

Example 38 includes the subject matter of any of Examples 30-37, and further comprising means for requesting raw sensor data corresponding to the sensor data in response to a determination that the confidence score does not satisfy the threshold value.

Example 39 includes the subject matter of any of Examples 30-38, and further comprising means for transmitting, in response to a determination that the confidence score does satisfy the threshold value, the confidence data to a remote server.

Example 40 includes the subject matter of any of Examples 30-39, and further comprising means for determining, based on the classification data, whether the classification of the sensor data is unknown, and means for requesting, in response to a determination that the classification is unknown, assistance from the user of the compute device to classify the sensor data.

Example 41 includes the subject matter of any of Examples 30-40, and wherein the means for requesting assistance from the user comprises means for displaying a plurality of classifications for the sensor data; and means for receiving, from the user, a selection of one of the plurality of classifications.

Example 42 includes the subject matter of any of Examples 30-41, and further comprising means for requesting raw sensor data corresponding to the sensor data in response to a determination that the classification is unknown; and means for determining an assigned classification of the sensor data based on the selection received from the user and the raw sensor data.

Example 43 includes the subject matter of any of Examples 30-42, and further comprising means for transmitting the assigned classification and the raw sensor data to a remote server.

What is claimed is:

1. A compute device for user-assisted machine learning, the compute device comprising:
    communication circuitry to obtain classification data indicative of a classification of sensor data generated from one or more sensors, wherein the classification data includes a confidence score indicative of a level of confidence of the classification of the sensor data;
    a sensor data classification circuitry to determine whether the confidence score of the classification of the sensor data satisfies a threshold value, the communication logic to request raw sensor data corresponding to the sensor data in response to the determination that the confidence score does not satisfy the threshold value; and
    user-assisted learning circuitry to request, in response to the determination that the confidence score does not satisfy the threshold value, assistance from a user of the compute device to classify the sensor data.

2. The compute device of claim 1, wherein the communication circuitry is to receive the classification data indicative of an activity of a pet from a smart pet collar.

3. The compute device of claim 2, further including a display, and wherein the user-assisted learning circuitry is further to cause, in response to a determination that the confidence score does satisfy the threshold value, the display to present an indication of an activity of the pet on the display.

4. The compute device of claim 1, further including a display, wherein the user-assisted learning circuitry is further to:
    cause the display to present a plurality of classifications for the sensor data on the display; and
    receive, from the user, a selection of one of the plurality of classifications.

5. The compute device of claim 4, wherein the communication circuitry is further to receive raw sensor data corresponding to the sensor data, and wherein the user-assisted learning circuitry is further to determine an assigned classification of the sensor data based on the selection received from the user and the raw sensor data.

6. The compute device of claim 1, wherein the sensor data classification circuitry is further to determine, based on the classification data, whether the classification of the sensor data is unknown, and the user-assisted learning circuitry is further to request, in response to a determination that the classification is unknown, assistance from the user of the compute device to classify the sensor data.

7. The compute device of claim 6, further including a display, wherein the user-assisted learning circuitry is further to:
    cause the display to present a plurality of classifications for the sensor data on the display; and
    receive, from the user, a selection of one of the plurality of classifications.

8. The compute device of claim 7, wherein:
    the communication circuitry is further to request raw sensor data corresponding to the sensor data in response to a determination that the classification is unknown; and
    the user-assisted learning circuitry is further to determine an assigned classification of the sensor data based on the selection received from the user and the raw sensor data.

9. A method for user-assisted machine learning, the method comprising:
    obtaining, by a compute device, classification data indicative of a classification of sensor data generated from one or more sensors, wherein the classification data includes a confidence score indicative of a level of confidence of the classification of the sensor data;
    determining, by the compute device, whether the confidence score of the classification of the sensor data satisfies a threshold value;
    requesting, by the compute device, raw sensor data corresponding to the sensor data in response to the determination that the confidence score does not satisfy the threshold value; and
    requesting, by the compute device and in response to the determination that the confidence score does not satisfy the threshold value, assistance from a user of the compute device to classify the sensor data.

10. The method of claim 9, wherein obtaining the classification data further includes receiving the classification data indicative of an activity of a pet from a smart pet collar.

11. The method of claim 10, further including causing display of, in response to a determination that the confidence score does satisfy the threshold value, an indication of an activity of the pet on a display of the compute device.

12. The method of claim 9, wherein requesting assistance from the user further includes:

causing display of, on a display of the compute device, a plurality of classifications for the sensor data; and
receiving, from the user, a selection of one of the plurality of classifications.

13. The method of claim 12, further including:
receiving, by the compute device, raw sensor data corresponding to the sensor data; and
determining an assigned classification of the sensor data based on the selection received from the user and the raw sensor data.

14. The method of claim 9, further including:
determining, by the compute device and based on the classification data, whether the classification of the sensor data is unknown, and requesting, by the compute device and in response to a determination that the classification is unknown, assistance from the user of the compute device to classify the sensor data.

15. The method of claim 14, wherein requesting assistance from the user further includes:
causing display of, on a display of the compute device, a plurality of classifications for the sensor data; and
receiving, from the user, a selection of one of the plurality of classifications.

16. The method of claim 15, wherein the requesting of the raw sensor data is further performed in response to a determination that the classification is unknown, the method further including determining an assigned classification of the sensor data based on the selection received from the user and the raw sensor data.

17. One or more machine-readable storage media comprising a plurality of instructions stored thereon that, when executed, cause a compute device to:
obtain classification data indicative of a classification of sensor data generated from one or more sensors, wherein the classification data includes a confidence score indicative of a level of confidence of the classification of the sensor data;
determine whether the confidence score of the classification of the sensor data satisfies a threshold value;
request raw sensor data corresponding to the sensor data in response to a determination that the confidence score does not satisfy the threshold value; and
request, in response to the determination that the confidence score does not satisfy the threshold value, assistance from a user of the compute device to classify the sensor data.

18. The one or more machine-readable storage media of claim 17, wherein the instructions, when executed, further cause the compute device to receive the classification data indicative of an activity of a pet from a smart pet collar.

19. The one or more machine-readable storage media of claim 18, wherein the plurality of instructions, when executed, further cause the compute device to cause display of, in response to a determination that the confidence score does satisfy the threshold value, an indication of an activity of the pet on a display of the compute device.

20. The one or more machine-readable storage media of claim 17, wherein the plurality of instructions, when executed, further cause the compute device to:
cause display of, on a display of the compute device, a plurality of classifications for the sensor data; and
receive, from the user, a selection of one of the plurality of classifications.

21. The one or more machine-readable storage media of claim 20, wherein the plurality of instructions, when executed, further cause the compute device to:
receive raw sensor data corresponding to the sensor data; and
determine an assigned classification of the sensor data based on the selection received from the user and the raw sensor data.

22. The one or more machine-readable storage media of claim 17, wherein the plurality of instructions, when executed, further cause the compute device to:
determine, based on the classification data, whether the classification of the sensor data is unknown, and
request, in response to a determination that the classification is unknown, assistance from the user of the compute device to classify the sensor data.

23. The one or more machine-readable storage media of claim 22, wherein the plurality of instructions, when executed, further cause the compute device to:
cause display of, on a display of the compute device, a plurality of classifications for the sensor data; and
receive, from the user, a selection of one of the plurality of classifications.

24. The one or more machine-readable storage media of claim 23, wherein the request for raw sensor data is further performed in response to a determination that the classification is unknown, and wherein the plurality of instructions, when executed, further cause the compute device to determine an assigned classification of the sensor data based on the selection received from the user and the raw sensor data.

25. An apparatus comprising:
at least one memory;
machine readable instructions; and
programmable logic circuitry to at least one of instantiate or execute the machine readable instructions to:
obtain classification data indicative of a classification of sensor data generated from one or more sensors, wherein the classification data includes a confidence score indicative of a level of confidence of the classification of the sensor data;
determine whether the confidence score of the classification of the sensor data satisfies a threshold value;
request raw sensor data corresponding to the sensor data in response to a determination that the confidence score does not satisfy the threshold value; and
request, in response to the determination that the confidence score does not satisfy the threshold value, assistance from a user of the apparatus to classify the sensor data.

26. The apparatus of claim 25, wherein the programmable logic circuitry is further to:
cause display of, on a display of the apparatus, a plurality of classifications for the sensor data; and
receive, from the user, a selection of one of the plurality of classifications.

27. The apparatus of claim 26, wherein the programmable logic circuitry is further to:
receive raw sensor data corresponding to the sensor data; and
determine an assigned classification of the sensor data based on the selection received from the user and the raw sensor data.

28. The apparatus of claim 25, wherein the programmable logic circuitry is further to:
determine, based on the classification data, whether the classification of the sensor data is unknown, and
request, in response to a determination that the classification is unknown, assistance from the user of the apparatus to classify the sensor data.

29. The apparatus of claim 28, wherein the request for raw sensor data is further performed in response to a determination that the classification is unknown, and wherein the programmable logic circuitry is further to:
- cause display of, on a display of the apparatus, a plurality of classifications for the sensor data;
- receive, from the user, a selection of one of the plurality of classifications; and
- determine an assigned classification of the sensor data based on the selection received from the user and the raw sensor data.

30. A compute device for user-assisted machine learning, the compute device comprising:
- means for obtaining classification data indicative of a classification of sensor data generated from one or more sensors, wherein the classification data includes a confidence score indicative of a level of confidence of the classification of the sensor data;
- means for determining whether the confidence score of the classification of the sensor data satisfies a threshold value, the means for obtaining to request raw sensor data corresponding to the sensor data in response to the determination that the confidence score does not satisfy the threshold value; and
- means for requesting, in response to the determination that the confidence score does not satisfy the threshold value, assistance from a user of the compute device to classify the sensor data.

31. The compute device of claim 30, wherein the means for obtaining the classification data includes means for retrieving classification data indicative of an activity of a pet from a smart pet collar.

32. The compute device of claim 31, further including means for displaying, in response to a determination that the confidence score does satisfy the threshold value, an indication of an activity of the pet on a display of the compute device.

33. The compute device of claim 30, wherein the means for requesting assistance from the user includes:
- means for displaying a plurality of classifications for the sensor data on a display of the compute device; and
- means for retrieving, from the user, a selection of one of the plurality of classifications.

34. The compute device of claim 33, wherein the means for determining is a first means for determining, further including:
- means for retrieving raw sensor data corresponding to the sensor data; and
- second means for determining an assigned classification of the sensor data based on the selection received from the user and the raw sensor data.

35. The compute device of claim 34, further including means for transmitting the assigned classification and the raw sensor data to a remote server.

36. The compute device of claim 30, further including means for transmitting, in response to a determination that the confidence score does satisfy the threshold value, the confidence data to a remote server.

* * * * *